(12) United States Patent
Kloosterman et al.

(10) Patent No.: US 7,375,842 B2
(45) Date of Patent: May 20, 2008

(54) VARIABLE DATA PRINTING USING VARIANTS

(75) Inventors: David Kloosterman, Penfield, NY (US); Timothy F. Donahue, Mendon, NY (US)

(73) Assignee: Eastman Kodak Company, Rochester, NY (US)

( * ) Notice: Subject to any disclaimer, the term of this patent is extended or adjusted under 35 U.S.C. 154(b) by 804 days.

(21) Appl. No.: 10/118,770

(22) Filed: Apr. 9, 2002

(65) Prior Publication Data

US 2003/0189724 A1 Oct. 9, 2003

(51) Int. Cl.
G06F 15/00 (2006.01)

(52) U.S. Cl. .................... 358/1.18; 358/1.1; 358/2.1; 358/1.15; 715/505; 715/506; 715/507; 715/517

(58) Field of Classification Search ............. 358/1.13, 358/1.14, 1.15, 1.18, 1.1, 2.1; 707/517; 715/505, 715/506, 507, 517

See application file for complete search history.

(56) References Cited

U.S. PATENT DOCUMENTS

| | | | |
|---|---|---|---|
| 5,129,049 A | 7/1992 | Cuzzo et al. | 395/113 |
| 5,214,779 A | 5/1993 | Barker et al. | 395/600 |
| 5,562,351 A | 10/1996 | Uematsu | 400/68 |
| 5,666,543 A | 9/1997 | Gartland | 395/788 |
| 5,729,665 A | 3/1998 | Gauthier | 395/117 |
| 5,740,338 A | 4/1998 | Gauthier et al. | 395/116 |
| 5,760,914 A | 6/1998 | Gauthier et al. | 358/298 |
| 5,795,930 A | 8/1998 | Gauthier et al. | 395/116 |
| 5,824,447 A | 10/1998 | Tavernier et al. | 430/124 |
| 5,845,302 A * | 12/1998 | Cyman et al. | 715/517 |
| 5,913,018 A | 6/1999 | Sela | 395/116 |
| 5,937,153 A | 8/1999 | Gauthier | 395/117 |
| 5,963,968 A | 10/1999 | Warmus et al. | 707/517 |
| 5,983,243 A | 11/1999 | Heiney et al. | 707/500 |
| 6,046,818 A | 4/2000 | Benson | 358/1.18 |
| 6,052,198 A | 4/2000 | Neuhard et al. | |
| 6,088,710 A | 7/2000 | Dreyer et al. | 707/517 |

(Continued)

FOREIGN PATENT DOCUMENTS

| | | |
|---|---|---|
| DE | 41 39 484 A1 | 6/1992 |
| EP | WO 01/55869 A1 | 8/2001 |
| EP | WO 01/59696 A2 | 8/2001 |

OTHER PUBLICATIONS

U.S. Appl. No. 10/118,771, filed Apr. 9, 2002, David Kloosterman, et al., Variable Data Printing Using Family Groupings, Amendment mailed on Mar. 21, 2007.

U.S. Appl. No. 10/118,772, filed Apr. 9, 2002, David Kloosterman, et al., Variable Data Printing Dynamic Imposition Template, Amendment mailed on Mar. 21, 2007.

U.S. Appl. No. 10/118,773, filed Apr. 9, 2002, David Kloosterman, et al., Method and Apparatus for Using Fields of Data to Organize Variable Data Print Jobs, Amendment mailed on Mar. 21, 2007.

(Continued)

*Primary Examiner*—Twyler Lamb
*Assistant Examiner*—Vu Hang
(74) *Attorney, Agent, or Firm*—Lawrence P. Kessler

(57) ABSTRACT

A method and apparatus for preparing a Variable Data Print job for printing, having a plurality of documents that are to be printed wherein, each of the documents are defined by variant elements related to content, layout and product intent. Groups are created and defined by a commonality of variants within the document relating to layout and product intent. At least one parameter that relates to the variants is used as a selection criteria to form a plurality of sub-groups. The sub-groups are then arranged for printing according to the form of selection criteria.

16 Claims, 7 Drawing Sheets

U.S. PATENT DOCUMENTS

| | | | |
|---|---|---|---|
| 6,134,018 A | 10/2000 | Dziesietnik et al. | 358/1.15 |
| 6,205,452 B1 | 3/2001 | Warmus et al. | 707/500 |
| 6,209,010 B1 | 3/2001 | Gauthier et al. | 707/526 |
| 6,243,172 B1* | 6/2001 | Gauthier et al. | 358/1.18 |
| 6,276,724 B1* | 8/2001 | Zorn | 283/56 |
| 6,290,406 B1 | 9/2001 | Gauthier et al. | 400/76 |
| 6,952,801 B2* | 10/2005 | Warmus et al. | 715/251 |
| 7,003,723 B1* | 2/2006 | Kremer et al. | 715/234 |
| 2002/0015169 A1 | 2/2002 | Vidyanand | |
| 2002/0184324 A1* | 12/2002 | Carlin et al. | 709/206 |
| 2002/0191219 A1* | 12/2002 | Bondy et al. | 358/1.18 |
| 2003/0041102 A1 | 2/2003 | Simpson et al. | |
| 2003/0061217 A1 | 3/2003 | Whittingham et al. | |

OTHER PUBLICATIONS

JDF Specification by CIP4 Organization, pp. 165-170, 175-182, 223-233, 270-275.

CGATS.20-200x, Graphic Technology—Variable printing data exchange using PPML and PDF (PPML/VDX), Draft #13, Jan. 21, 2002 [the entire document].

PPML Functional Specification, Version 1.5, May 31, 2001 [the entire document].

* cited by examiner

VARIABLE DATA PRINTING USING VARIANTS

CROSS-REFERENCE TO RELATED APPLICATIONS

This application is related to the following applications filed concurrently herewith:

U.S. patent application Ser. No. 10/118,771, filed in the names of David Kloosterman, et al., and entitled, VARIABLE DATA PRINTING FAMILIES; U.S. patent application Ser. No. 10/118,772, filed in the names of David Kloosterman, et al., and entitled, VARIABLE DATA PRINTING DYNAMIC IMPOSITION TEMPLATE; U.S. patent application Ser. No. 10/118,773, filed in the names of David Kloosterman, et al., and entitled, METHOD AND APPARTUS FOR USING FIELD OF DATA TO ORGANIZE VARIABLE DATA PRINT JOBS.

FIELD OF THE INVENTION

The present invention relates to processing Variable Data Print jobs, and more particularly, to employing variants contained within each document to be printed to create derivative prints jobs in a desired manner.

BACKGROUND OF THE INVENTION

Variable Data Printing (VDP) is a form of printing that produces individualized printed pieces, each of which contain printed pages containing information targeted to an individual recipient. VDP authoring combines the graphical arts practice of graphical page authoring with Information Technology (IT) to provide utility to create variable data print jobs that will be input to one or more print production processes in which the printed and finished pieces are manufactured. The various variable content Instance Documents comprising a VDP Job are authored based on data drawn from a database containing records of information that characterizes the individual recipients. VDP is seen as having the potential to enable the high degree of one-to-one marketing communications for the graphic arts and printing industries as has been seen in one-to-one marketing practice using communication mediums such as the Internet.

A common problem that exists using VDP is that making print jobs using a variable data will typically take longer for a Raster Image Processor (RIP) to rasterize and print than a conventional static print job using non-variable data. Variable print data is sent to a RIP where code for text elements and graphic elements are processed into a raster data format that can be utilized by the marking engine of a digital printer. Therefore, every page having variable data must have each and every code element Raster Image Processed (RIPped). The necessity of having to individually RIP the elements having variable data creates a substantial processing bottleneck compared to RIPping static print jobs comprised of a single document which need only be RIPped once, and the many copies are imaged from the same RIPped result.

Beyond the conventional variable data printing practice of varying page content for respective Instance Documents, it is also possible to vary other characteristics of the printed pieces such as finishing characteristics including binding style, and substrate selection based on rules sensitive to the same recipient database information used in the conditional mapping of page content. In this way, for example, recipients of higher value to the marketing firm for which the VDP Job is produced, can receive a printed piece on a higher quality print media with a higher quality binding, whereas, their lower value customers with less value potential may only receive a corner stapled document that is less expensive to produce but has sufficient marketing impact to be noticed by the intended recipient. This implies the need to store along with the page content and layout data, additional data that expresses the physical characteristics of each piece to be manufactured known as product intent data. The addition of product intent data, which may vary the physical characteristics of the finished documents of the VDP job based on the data profile of the various recipients, may add significant complexity to the manufacturing process workflow in the print provider's environment where the required workflow may not be achievable. Hence, a significant problem exists where it is possible to author a VDP Job without knowledge of the print provider's manufacturing workflow capabilities that is too complex to be produced.

Accordingly, there is an ongoing desire within the graphic arts industry to correct the previously discussed shortcomings within the prior art and to enable a faster form of VDP up to final print production and finishing. It is also desirable to use currently practiced methodology within the print engine. The graphic arts industry needs both a method and an apparatus that can provide an efficient and reliable exchange of variable data for use in variable data print jobs.

A page definition mark up language, called Personalized Print Markup Language (PPML), developed by the Print On Demand Initiative (PODi) is an example of a data format that can represent the layout of the pages of the many unique Instance Documents of a variable data print job. PPML is based on the Extensible Markup Language (XML) and is structured in such a way that content data that is used multiple times under the same rendering context on one or more pages is explicitly identified so as to enable a consuming RIP process opportunities for improved processing performance. Ideally a PPML RIP would process all content elements, including both the identified reused and non-reused content elements, a single time where the re-used elements are stored in a cache after they are first RIPed and then reused as raster data.

Allowing a printer RIP to store and re-use rasterized graphic elements as needed provides a tremendous improvement in processing performance. The ability to re-use these elements also eliminates the need to resend the source code that defines the content element to the printer/RIP multiple times during the same print job. PPML is a significant advancement for variable data printing because it allows a printer/RIP to understand at an object level rather than a page level. It allows a printer/RIP to have a certain degree of intelligence and manipulate the components (objects) that make up a page. It also provides code developers the ability to name objects, which permits the re-use of the objects as needed during printing of a variable-data job.

Variable Data Exchange (VDX) is a standard that has recently been evolving within Committee for Graphic Arts Technologies Standards (CGATS), as a production tool for variable data in the form of a VDX instance combined with PPML. A VDX instance can be looked at as a compilation of records that define the content and layout of many composite pages. These VDX instances can be used with PPML to create the composite definitions of PPML/VDX Instance Documents. Each composite page of a PPML/VDX Instance Document is an assembly of one or more partial pages or content objects referred to as compound elements. PPML/VDX allows compound elements to be defined once and referenced many times from the various composite page layout instances to effectively reduce the overall size of data for a PPML/VDX instance.

The layout data that describes the composite pages of a PPML/VDX instance is defined using a subset of the previously described PPML. The data format required by the PPML/VDX standard for defining the compound element source data is the Adobe Portable Document Format (PDF) defined and maintained by Adobe Systems®. In PPML/VDX, the source PDL data that defines a compound element that is placed on a PPML defined page layout is always expressed as a page of a PDF file. PDF files used to define PPML/VDX compound elements must contain all the supporting resources such as fonts, image data, and color profiles. PDF files used to define PPML/VDX compound elements must also define all color content in a known reference device or device independent color-space.

VDX requires that the PPML layout data of a VDX instance be stored as a single, randomly accessible PDF object stream that is stored within a PDF file. Depending upon the conformance level, the PDF file embedding the PPML data may also contain some, or possibly all, of the PDF page object definitions required by the VDX instance that results in a PPML layout data object. The PPML/VDX file that has an XML element that contains the PPML and product intent data, referred to as the PPML/VDX Layout File. PDF files that contain only PDF page objects used only for defining compound element definitions and have no XML elements stored within them and may be referenced from the PPML data store in a PPML/VDX Layout file, these PDF files are referred to as a PPML/VDX Content File.

A completely specified device and production workflow independent VDP Job definition is comprised of three basic components, two of which define the appearance of the variable page content, namely layout (also referred to as mark-up) data, and content data. In a PPML/VDX instance, the layout component is defined by the PPML data, and the content component is defined by the PDF data. The third component, known as product intent data, provides the description of the finished product. The product intent data typically includes information such as document binding styles, single and/or two sided print options, substrate types, and other attributes of a print product description required for communicating to a print service provider the definition of the final print products that are to be manufactured. Product intent information does not define the controls of a particular target manufacturing process or device because such information is usually not known to the PPML/VDX authoring agent. These device control parameters are usually only known to the print provider who receives the exchanged VDP Job data. The print provider, therefore, must derive the manufacturing specifications specific to their production workflow or workflows from the product intent, layout, and content data specification created by their customer.

A PPML/VDX instance is created by a data driven merge process referred to as a variable data merge engine. The merge engine typically executes within an authoring environment for variable data. The authoring environment can be located at a different location from the graphic arts establishment that actually prints the final pages of the variable data documents. In some scenarios, a PPML/VDX instance may be sub-divided into several PPML/VDX instances that can be transferred to different locations to be printed. Generation of a PPML/VDX instance by the variable data merge engine is considered a final activity in the somewhat complex process for authoring variable data. The PPML/VDX instance can be transferred to a print production workflow within the same or different operating environment where it can be viewed by a prepress operator, and placed into a final production ready form that is suitable for the digital printer used at that location.

The PPML/VDX is a portable format that is expected to enable growth in the practice of variable data printing within the printing industry. PPML/VDX allows printers with dynamic digital printing capability to participate in variable printing without the need to acquire one-to-one marketing, variable layout design, or data processing expertise. However, PPML/VDX is strictly a final form variable data and layout format that is device independent. Therefore, PPML/VDX does not support the inclusion of data that is specific to a printing device such as imposition layout, trapping parameters, traps, or any printer or general device control information. Accordingly, data that contains specific information for a printing device needs to be added later during the prepress activity when the print job is being prepared for production.

From the foregoing discussion it should be apparent that there remains a need within the art for a method and apparatus that can supply printing device specific data to be used in conjunction with PPML/VDX instances to enable growth in variable data printing practice within the printing industry.

SUMMARY OF THE INVENTION

The present invention addresses the problems within the prior art in order to enhance variable data printing practice within the printing industry and facilitate the production of VDP Jobs. A VDP Job as used within the context of the invention consists of Instance Documents that significantly differ in terms of how they are to be produced. For example, the Instance Documents can vary in page length, the type of media used, the number of pages that exceed the imaging area, number of copies, and finishing. The invention is a VDP prepress workflow component that provides the prepress operator with the ability to analyze and view the data of the VDP Job, then setup the job within the digital press environment such that the VDP Job can be optimally produced.

The VDP prepress workflow component of the invention is, preferably, an Acrobat® plug-in. The plug-in is designed so that each feature can stand alone, and that features can be either added or deleted, incrementally. The VDP prepress workflow component is able to analyze, view, and prepare the VDP Job for production. The output of the component is one or more "Production Ready" jobs.

The invention provides the foregoing features by providing a method and apparatus for preparing a Variable Data Print job for printing having a plurality of documents that are to be printed, wherein, each of the documents are defined by variant elements related to content, layout and product intent. Groups are created and defined by commonality of variants within the document relating to layout and product intent. A selection criteria in the form of at least one parameter relating to the variants is used by the selection criteria to form a plurality of sub-groups. The sub-groups are then arranged for printing according to the from the selection criteria.

BRIEF DESCRIPTION OF THE DRAWINGS

FIG. 1b is an illustration of the preferred device for running the functions shown in FIG. 1a;

DETAILED DESCRIPTION OF THE INVENTION

The present invention presents a description of the sequence of actions that a system performs upon a Variable Data Print (VDP) Job so that it can be efficiently produced. The preferred embodiment envisions a VDP prepress workflow component that provides a user-friendly utility to the prepress operator for facilitating the production of VDP Jobs. A VDP Job may consist of Instance Documents that differ significantly in terms of how they are to be produced. For example, Instance Documents may vary in term of: page quantity; media type; the number of pages that exceed the area that can be imaged; page layout (one-sided versus two sided); page orientation (portrait versus landscape); metadata; number of copies, and finishing. The VDP prepress workflow component will provide the prepress operator with the ability to analyze and view the VDP Job, and then setup the VDP Job within the digital press environment using knowledge of the devices available in the environment such that the VDP Job can be optimally produced.

The preferred embodiment of the present invention provides the VDP prepress workflow component as an Acrobat® plug-in. The Acrobat® plug-in is preferably arranged within a modular architecture allowing each of numerous modules to be standalone, such that each of the modules can be added or deleted incrementally. The VDP prepress workflow component supports the PPML/VDX file format and allows the prepress operator to analyze, view, and prepare a VDP Job for production. The output of the VDP prepress workflow component of the invention is a plurality of production ready jobs.

Figure 1A:
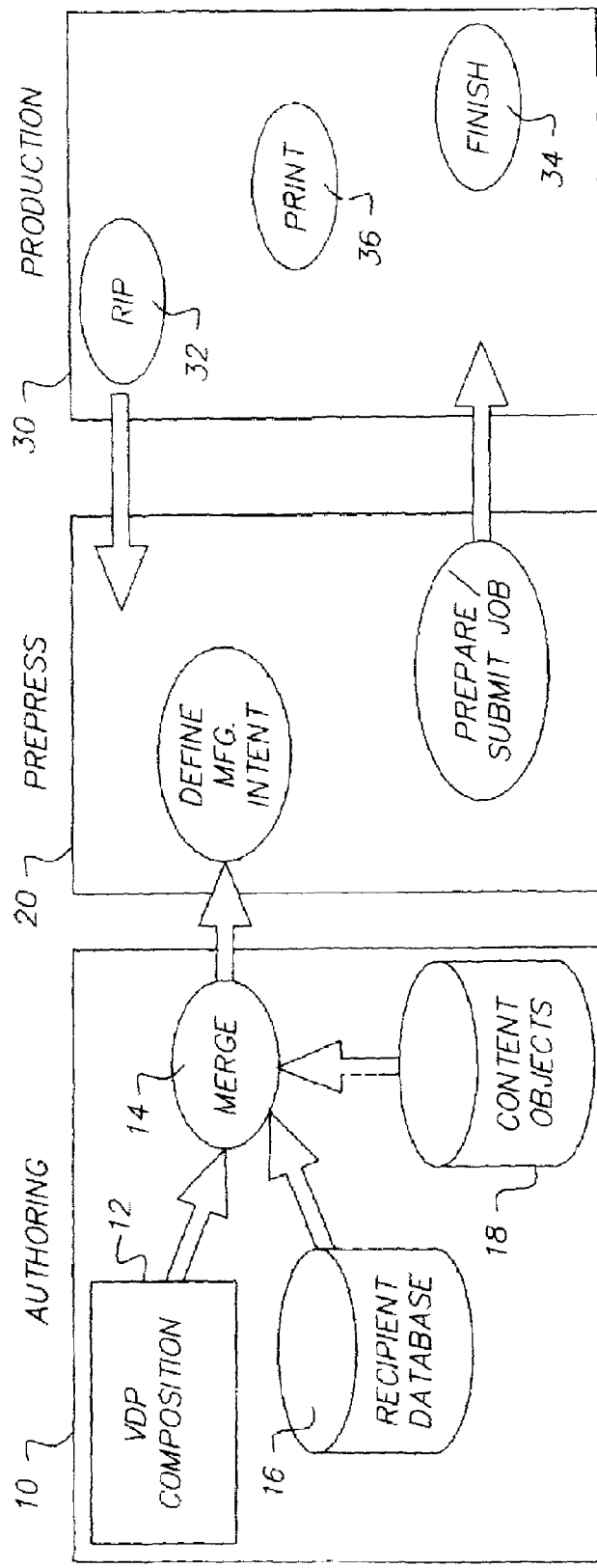
FIG. 1a is an illustration of the basic functions required for Variable Data Printing as envisioned by the invention.
Figure 1B:
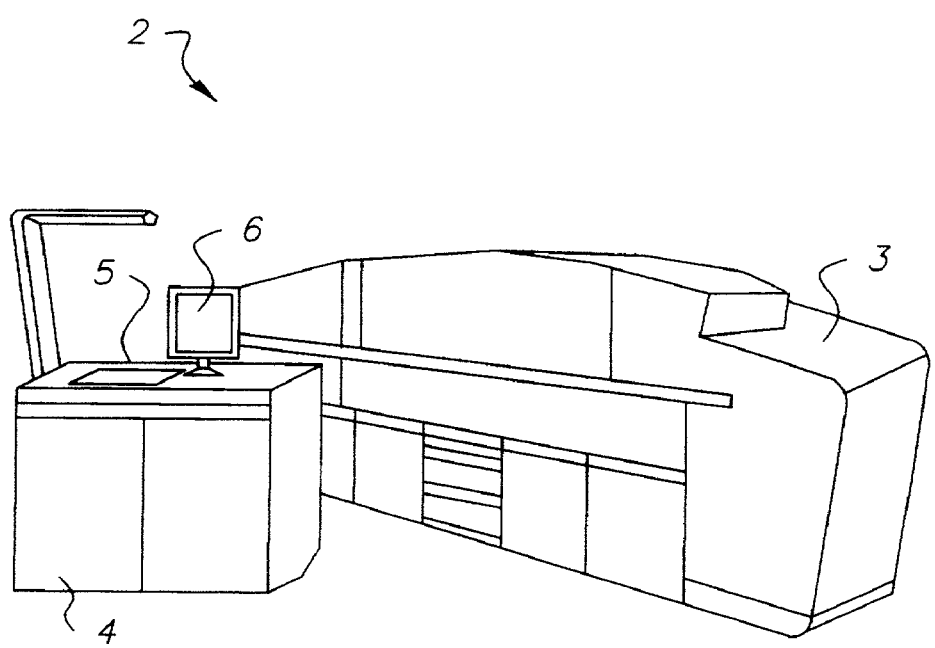

Referring to FIG. 1a, a VDP Job as envisioned by the present invention is accomplished in three basic areas. Authoring 10 provides the PPML/VDX file for the prepress 20. The invention operates in the area of prepress 20 to prepare the VDP Job for production 30. FIG. 1b illustrates a NexPress™ 2100 digital printing system 2 with GUI 6 and NexStation™ 4 providing input and control for printer 3.

Authoring 10 is typically performed by the graphic designer who adds variable content to static content using a utility within VDP composition 12, to add variable content to traditional static designs produced by applications such as Quark® and In Design®. Within the PPML/VDX standard, information known as product intent data may be included in PPML/VDX job data that describes information such as required media types, and binding styles. These product intent elements are encoded into a job ticket (such as PJTF of JDF). Each of these product intent characteristics are referenced from within the PPML data such that the Instance Document definitions defined in said PPML data are provided with a product intent definition. In this way the characteristics of the finished documents such as binding style, media types, copy quantity, and number of pages that exceed the imaging area, all of which contribute to the definition of the finished print product, are explicitly specified for any given document. The present invention will employ NexTreme™ as the tool for VDP Composition 12 within authoring 10. NexTreme™ is a proprietary authoring tool of NexPress Solutions, LLC, that generates the PPML/VDX document provided to prepress 20 and operates to create additional metadata in the form of extensions to the PPML/VDX variable data which is added by NexTreme™. These extensions can be items taken from the recipient database records such as the recipient's age, gender, postal address, or any other variable data that is specifically associated with the recipient. Authoring 10 will store these extensions as metadata within the PPML/VDX job 16. The prepress workflow application will later in the workflow draw upon the all of the product intent information including the metadata that is stored in the PPML/VDX job 16 as enunciated by the graphics artist using NexTreme™ to identify the optimal job ticket specification for printing the job.

The variable data, within the preferred embodiment, comes from data in recipient databases 16 that characterize the targeted audience. It is envisioned that the highly customized printed material which results from Variable Data Printing will enable in the printing industry the success being seen today in Internet one-to-one marketing. Merge 14 is a process wherein data from the recipient database 16, is combined with static content data that is contained in content objects 18 to produce the merged PPML/VDX instance document. To understand the description of the merge process 14, a brief discussion of the hierarchical structure of a VDX file is in order.

A VDX file, as used herein, refers to the VDX portion a PPML/VDX file. The PPML/VDX file is, primarily, the utilization of PPML (an implementation of XML technology) to describe the position of PDF objects on every page of a VDP Job consisting of one or more Instance Documents. As previously described, an authoring application is required to author a PPML/VDX job. The preferred embodiment uses NexTreme™ (a proprietary VDP authoring application of NexPress Solutions, LLC), however, other VDP authoring applications can also be used to practice the invention. The graphical artist creates a template consisting of static images, graphics and text as well as variable images, graphics and text in VDP composition 12. The variable parts of the layout will have an associated set of rules that describe the procedures necessary to create each Instance Document. For example, a print job could have a graphical box designated to contain a picture of an automobile for an advertisement to every person listed within a recipient database, the decision for the variable data that will be used for the automobile would be something like the following:

if (income>$100000) then Lexus.pdf;

else if (income>$50000) then Ford.pdf;

else Yugo.pdf.

Therefore, the Content objects 18 database must contain the following PDF files: Lexus.pdf, Ford.pdf, and Yugo.pdf.

Once the VDP Job is composed in a PPML/VDX file format, merge 14 is a process that generates an Instance Document for every record in the recipient database 16. The recipient database 16 is a file containing a database of records relating to metadata of the recipients. For example, the recipient database 16 could very well look like Table 1 below.

TABLE 1

| Name | Income | Age |
|---|---|---|
| Jack Snow | $55000 | 25 |
| Bob Smith | $120000 | 55 |
| Jane Doe | $250000 | 45 |
| Sally Jones | $12000 | 21 |

During the merge process, the VDP authoring application looks at one record at a time from the recipient database 16, and generates a single Instance Document by using the template containing static and variable images, graphics and text. Merge 14 applies the static objects to each of the Instance Documents using the rules as defined by the author for the inclusion of variable objects. In the above example, merge 14 first generates an Instance Document (a VDX file) for Jack Snow. Merge 14 then adds a picture to the Instance Document for Jack Snow and applies the rules that were given by the author during the authoring process which results in the system going to the recipient database 16 and retrieving the file, Ford.pdf. Finally, merge 14 adds Ford.pdf into the VDX file and put an entry in the PPML portion of the file describing where Ford.pdf goes on a specific page for Jack Snow's Instance Document. The result after merge 14 is a VDX file having a PPML portion that describes one Instance Document for each record in the recipient database 16, plus all of the images, graphics, and text objects which usually come from a Content Database.

The preferred embodiment of the present invention is a VDP system that is a scaleable, end-to-end solution utilizing an open PDF based workflow architecture that recognizes the importance of, and supports, the de-coupling of VDP authoring and VDP print production. The process of de-coupling the VDP authoring from the VDP print production has necessitated the creation of VDP prepress workflow components as a tool that can be used by the prepress operator during prepress 20 to optimally manufacture the VDP print job as described from the job producer. The VDP print job, which is received for processing during prepress 20 by the prepress operator, will contain anywhere from one to tens of thousands Instance Documents which lack any structure in terms of pages per document, copies per document, media, pages exceeding imaging area requirements, and finishing options. To enable the accurate and efficient manufacturing of the entire VDP Job as specified by the PPML/VDX file, the prepress 20 component will provide a set of tools to analyze, view, and prepare the VDP Job for the production 30. During production 30, the raster image processor (RIP) 32 will convert the code for each text and graphics element on every page into a format that can be printed by the print engine. After the VDP Job has been RIPped, it printed 36 and finished 34.

Figure 2:
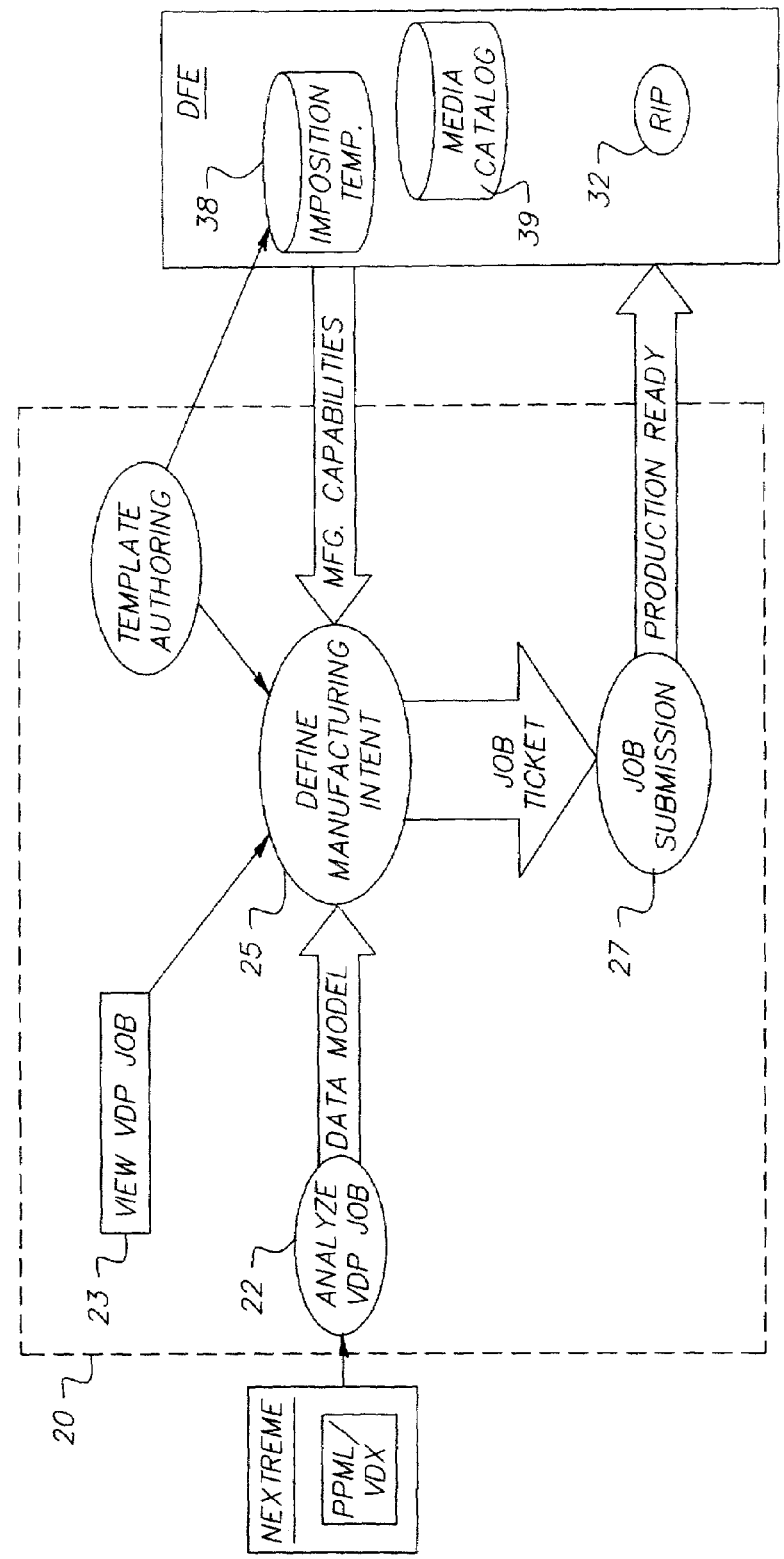
FIG. 2 is a diagram illustrating the prepress workflow of a print job from the authoring to the production.

FIG. 2 is a diagram illustrating the workflow performed by the prepress 20 after the PPML\VDX has been received from authoring 10 through production 30. The prepress 20 as illustrated in FIG. 2, will take the VDP Job as an input in the form of a PPML/VDX instance file and provide an output to production 30 that is a VDP Job that ready to be printed.

The VDP prepress 20 is preferably an Acrobat® plug-in and provides functionality consistent with typical Acrobat® plug-in "look and feel". Preferably, prepress 20 is provided with high-level functions that give the prepress 20 the ability to: view a VDP Job, analyze a VDP Job; define production parameters for a VDP Job; provide for VDP Job submission; define the finish verification for a VDP Job; and create derivative VDP Jobs.

Still referring to FIG. 2, View VDP Job 23 allows the prepress operator to view the PPML/VDX file as it is to be finished and allows the prepress operator to view a PPML/VDX file, one page at a time, as it would look to the customer after being printed and finished. The prepress operator opens the PPML/VDX file while in the prepress 20 environment, and the first page of the first Instance Document is displayed. Under the standard Acrobat® "Bookmarks" tab, the PPML/VDX file is divided on Instance Document boundaries. The prepress operator can select any Instance Document bookmark and view it's first page. View VDP Job 23 allows the prepress operator to utilize all standard Acrobat® Page-Up/Page-Down features to view the PPML/VDX file. View VDP Job 23 can be run to allow viewing of a PPML/VDX file with minimal performance degradation compared to viewing PDF files by themselves.

The PPML/VDX file is tested upon being opened to determine if it is either "Valid" or "Well-Formed"; definitions of "Valid" and "Well-Formed" are as specified by the Extensible Markup Language (XML) 1.0 and are specified by the prepress operator. Within the preferred embodiment, the VDP prepress software senses that it has opened a VDP file and enables all applicable VDP functionality. Once the PPML/VDX file is opened, the initial view is of the first page of the first document. The prepress operator views other pages by using standard Acrobat® navigational tools.

The preferred embodiment of the invention uses system software to allow viewing of PPML/VDX files as composed PPML/VDX pages (pre-imposed PPML/VDX pages). The default viewing level of the system software is to view all PPML/VDX files as composed PPML/VDX pages. The system software supports standard Acrobat® navigation of pages in a PPML/VDX file by displaying them within the user interface with a unique numerical identifier for each Instance Document. The unique identifier will correspond to the top down order of the Instance Document in the PPML/VDX file. The first Instance Document is Instance Document #1.

The preferred embodiment allows viewing of PPML/VDX pages in a PPML/VDX file as benchmarked against PDF files with little or no performance degradation because viewing a PPML/VDX file is equivalent to viewing a strictly PDF version of the content. The preferred embodiment also supports standard Acrobat® bookmarks for identifying Instance Documents within Instance Documents. Additionally, the system software of the preferred embodiment supports pre-imposed views of PPML/VDX files within the network environment of the application. The system software also supports pre-imposed and imposed sheet views of PPML/VDX files within an accessible NexStation™ 4 environment. It should be noted that this involves supporting part of the proprietary interface to the NexStation™ 4.

The preferred embodiment allows the locking onto a specific page number of an Instance Document such that subsequent navigating via the Page Up/Down keys result in navigating to the same page number of the previous/next Instance Document if it exists.

The View VDP Job 23 performs a function that allows the PPML/VDX file to be viewed as it is to be printed (finished). This will enable a prepress operator to view sheets within a PPML/VDX file, one at a time, as the sheets would look after being printed. Once the prepress operator successfully opens a PPML/VDX file with the prepress component, the option to view the file as imposed can be selected by the operator via the GUI 6. If an Adobe Job Ticket (PJTF or JDF) is already associated with the PPML/VDX file, the viewer shows the imposed sheet surface. This view includes page layout, relevant document marks (trim, fold, bleed, bar codes), and annotations. The preferred embodiment does not provide bookmarks in this view, because there is no rule preventing Instance Documents from overlapping on sheet surfaces. The prepress operator can utilize all standard Acrobat® Page-Up/Page-Down features to view the PPML/VDX file. Minimal performance degradation can be expected while viewing a PPML/VDX file in the imposed view when benchmarked against viewing a PPML/VDX file in the pre-imposed view.

In order for the prepress operator to run View VDP Job 23, the PPML/VDX file is first opened by system software and an Adobe® Job Ticket (PJTF or JDF) is associated with the PPML/VDX file to describe the imposition layout for the VDP print job. The prepress operator selects an option via the GUI 6 that will allow viewing of the PPML/VDX file as it is be printed in imposed form. The prepress operator can view other pages as well by using standard Acrobat® navigational tools. The preferred embodiment envisions allowing select viewing of the PPML/VDX file in an imposed form by supporting Adobe® Job Ticket (PJTF and JDF) layout parameters. A sheet surface view of a PPML/VDX file as specified by the associated Adobe® Job Ticket is provided with features such as page layout, document marks (trim, fold, bleed, bar codes), and annotations. The system software provides imposed views of PPML/VDX files within the network environment of the application. Imposed views of PPML/VDX files within an accessible NexStation™ 4 environment are also supported. Accordingly, the preferred embodiment is described in a manner that is specific to a NextStation™ 2100 environment, however, variations will be readily apparent to those of ordinary skill in the art that can easily be ported on other pieces of equipment.

View PPML/VDX File as a List of PDF Objects (not Composed)

View VDP Job 23 provides the prepress operator with the capability of viewing a PPML/VDX file, one PDF object at a time. In order to accomplish the viewing of single PDF objects, the system provides viewing of the PPML/VDX file as a sequence of randomly accessible PDF objects. After the prepress operator successfully opens a PPML/VDX file with the software for the prepress 20, the option to view the file as a randomly accessible list of PDF objects is selected. The viewing of the PPML/VDX file as a list of PDF objects can be helpful in debugging the appearance of the PPML/VDX content. There are no bookmarks in this view, since the objects in this view are independent of any page or Instance Document. The prepress operator can utilize all standard Acrobat® Page-Up/Page-Down features to view the PPML/VDX file.

Analyze VDP Job

The routine Analyze VDP Job 22 allows the system to characterize all of the Instance Documents in the VDP Job as they are delivered by the producer after authoring 10. The characterization made by Analyze VDP Job 22 yields information that allows the prepress operator to accurately and efficiently manufacture the entire VDP Job. A VDP Job within the preferred embodiment can consist of from 1 to more than 10,000 Instance Documents. The Instance Documents can vary from one to the next in terms of: page count; the number of pages that exceed the area that can be imaged upon; number of copies; logical finishing, Bind or Saddle-Stitch for example; page layout, one-sided, two-sided head to head or two-sided, head to toe for example; or orientation, such as portrait or landscape. Also Instance Documents can have variations in the logical sequence of media required. For example, each of the following is a unique sequence of media: A4, A4, A4; A4, A4, A4, A4; A4, A4, A3 and A3, A3, A3, A3, A3. Additionally, Meta-data can vary in the Instance Documents. Meta-data in the context of a VDP Job typically refers to information extracted from the recipient database and associated with an Instance Document. For example, a database may have a field containing the zip code of each person to receive a brochure. The VDP authoring application may allow the author to associate the value of each recipient's zip code with the resulting Instance Document in the "Private_Info" element of a PPML/VDX file. This meta-data information can then be used later in the workflow as a variant to a VDP Family.

Each of the variants within the Instance Documents is important because they impact how the printed document is to be produced which can impact the selection of a device, or the way a particular device is to be used; most notably, the imposition scheme.

Analyze VDP Job 22 characterizes all of the Instance Documents within a print job and places the characterized Instance Documents into groups referred to, herein, as VDP Families. A VDP Family is a group of Instance Documents having identical values for the set of variant parameters chosen by the prepress operator within a VDP Job. From the list of VDP Families and their corresponding parameters, the prepress operator can determine how to manufacture the entire VDP Job. With the benefit of the characterization from Analyze VDP Job 22 to work from, the prepress operator may choose to manufacture each VDP Family uniquely, or group any or all of the VDP Families together to be manufactured in a predetermined manner. Grouped VDP Families can be manufactured the same, or having some members of the group of VDP Families have one or more of the manufacturing variants be the same.

In order for the prepress operator to be able to navigate the VDP Job within prepress 20, it is necessary to be able to analyze the VDP Job functionality. Analyzing VDP Job functionality within the preferred embodiment is accomplished by selecting a tab for Analyze VDP Job 22 that is consistent with Acrobat® "Look and Feel". The prepress operator is given the opportunity to select which VDP Family variants to discriminate against. This could also mean supplying corresponding check boxes to each of the following variants: page count; media sequence; pages exceeding the imageable area; copy counts, layout sequence, orientation sequence, meta-data; and finishing. The prepress operator clicks on a button that initiates the VDP Job analysis. The VDP prepress workflow Software component scans the entire XML portion of the PPML/VDX file, and subsets the Instance Documents into VDP Families, which are a unique set of parameters as specified by the list of variants chosen by the prepress operator. The VDP prepress 20 displays in a clearly formatted text box for each Family, the number of Instance Documents it contains and the parameter value of each variant. For example:

Family 1-
    Contains 935 Instance Documents
    Page Count=6
    Media Sequence=A4, A4, A4, A4, A4, A4
    Exceed the imaging area Specified on Pages=none
    Copy Counts=1
    Finishing=Bind Layout Sequence=one-sided, two-sided-head-to-head, two-sided-head-to-head, two-sided-head-to-head, two-sided-head-to-head, one-sided Orientation Sequence=portrait, portrait, portrait, portrait, portrait, portrait, Meta-Data: Zip Code=12345

Family 2-
  Contains 60 Instance Documents
  Page Count=7
  Media Sequence =A4, A4, A4, A4, A4, A4, A4
  Exceeding the imaging area Specified on Pages=none
  Copy Counts=1
  Finishing=Bind
  Layout Sequence=one-sided, one-sided, two-sided-head-to-head, two-sided-head-to-head, two-sided-head-to-head, two-sided-head-to-head, one-sided
  Orientation Sequence=landscape, portrait, portrait, portrait, portrait, portrait, portrait,
  Meta-Data: Zip Code=55555

Family 3-
  Contains 5 Instance Documents
  Page Count=6
  Media Sequence=A4, A4, A4, A4, A4, A4
  Exceed imageable area Specified on Pages=1, 3, 6
  Copy Counts=1
  Finishing=Bind
  Layout Sequence=one-sided, two-sided-head-to-toe, two-sided-head-to-toe, two-sided-head-to-t, two-sided-head-to-toe, one-sided
  Orientation Sequence=portrait, portrait, portrait, portrait, portrait, portrait,
  Meta-Data: Zip Code=98765

Figure 3:
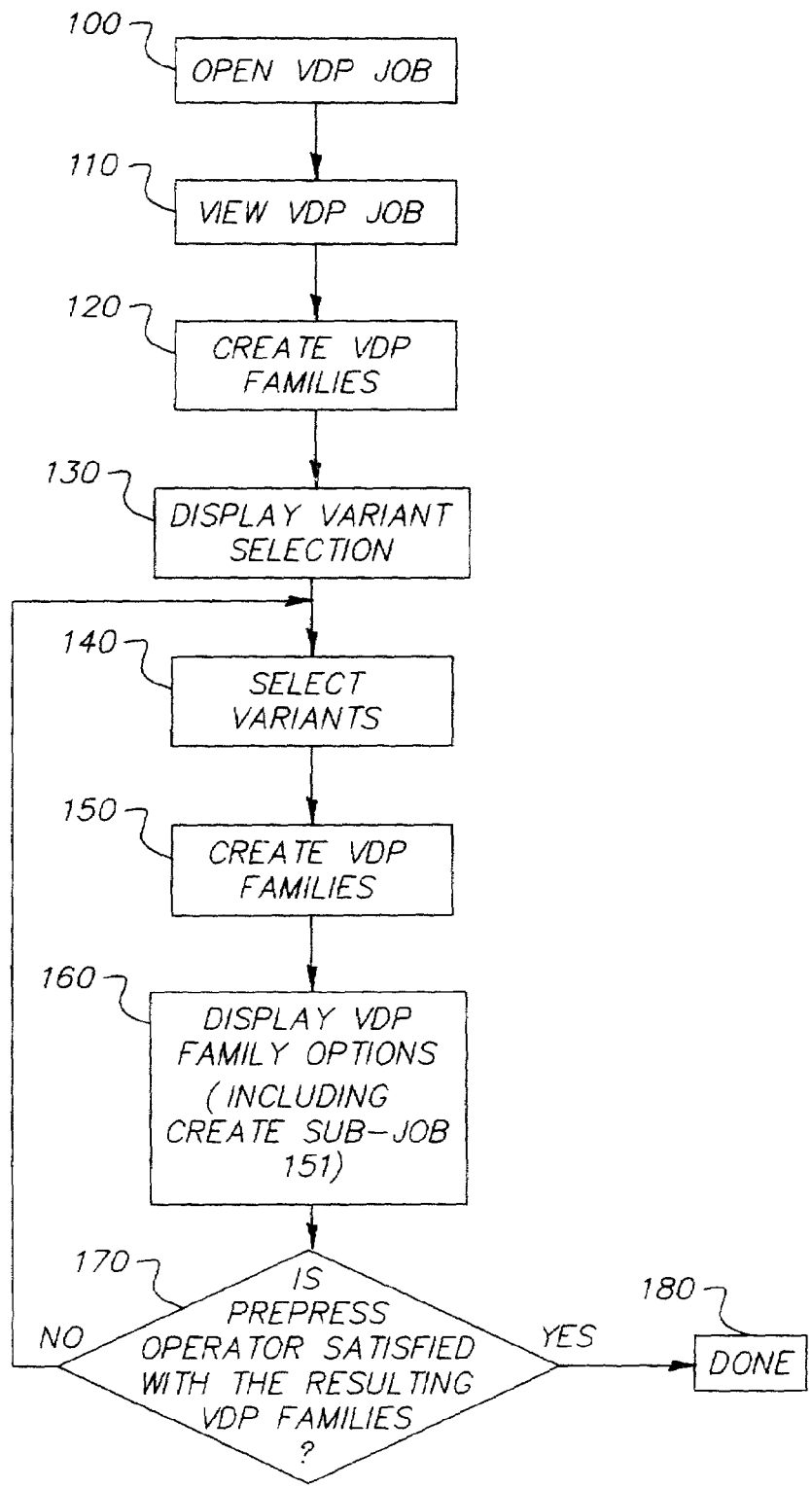
FIG. 3 is a flow diagram illustrating the process of the preferred embodiment of the present invention that characterizes the Instance Documents and classifies them into groups with common characteristics called Families.

FIG. 3 is a flow diagram of the routine used by, the preferred embodiment of the present invention that is responsible for characterizing all of the Instance Documents and arranging them into groups called VDP Families. A VDP Family is a group of Instance Documents within a VDP Job that contains equivalent values for the set of variants chosen by the prepress operator. It should be noted that an equivalent value as used within the context of the invention, is either a single value or a range of values, which each Instance Document within a VDP Family satisfies. From the list of VDP Families and their corresponding variants, the prepress operator should be able to clearly determine how to manufacture the entire VDP Job. With the benefit of the PPML/VDX analysis to work from, the prepress operator may choose to manufacture each Family uniquely, or group any or all of the Families together to be manufactured the same.

Still referring to FIG. 3, open VDP Job 100 is the entry point in the routine where the prepress operator opens the VDP prepress workflow component, which in the case of the present invention comprises opening a VDP Job. Observe VDP Job 110 invokes the View VDP Job 23 capabilities previously discussed and allows the operator to view the composed form of the VDP Job as it exists within the workflow application. An application menu pops up on GUI 6 and the prepress operator initiates the creation of VDP Families by selecting Start VDP Families Creation 120 from the application menu. The selection of Start VDP Families Creation 120 by the prepress operator results in the activation of Display Variant Selection 130. Display Variant Selection 130 is a display provided by the GUI 6 that presents a variety of variant parameters, that provides the prepress operator with a tool for the selection of variants by which Instance Documents will be sorted into VDP Families. Select Variants 140 is the process whereby the prepress operator selects variants from a combination of check boxes and text entry fields provided by Display Variant Selection 130. The variants chosen by the prepress operator will be used to create the VDP Families. Examples of variants are pages per Instance Document, number of copies required, media used, finishing requirement, pages that exceed the imaging area, page layout, page orientation, meta-data, etc.

Figure 4:
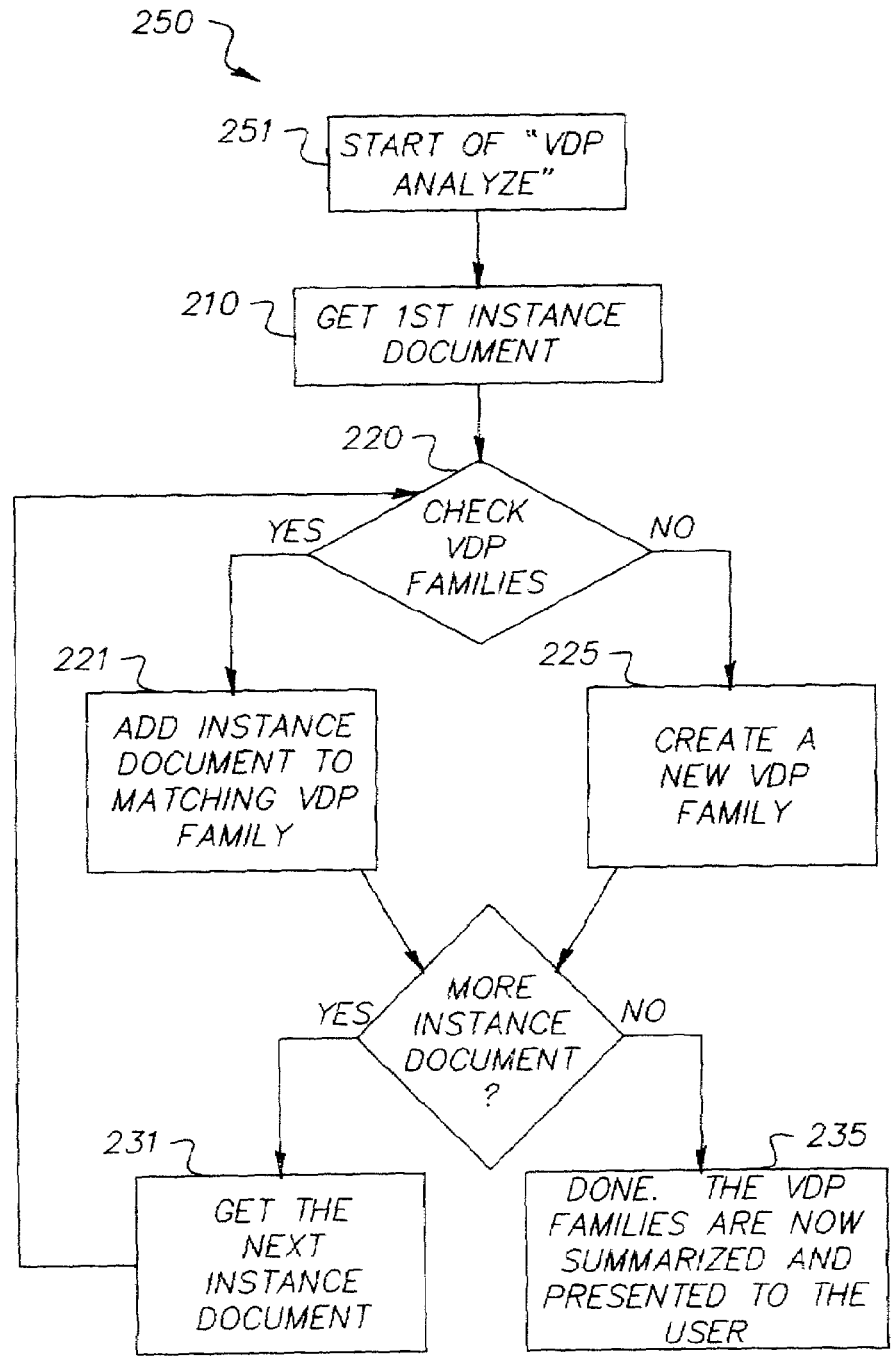
FIG. 4 is a flow diagram for the creation of Families within the present invention.

The prepress operator selects the variants that are to be employed, and the creation of VDP Families is initiated by VDP Analyze (a more detailed flowchart for the Create VDP Families 150 component is illustrated in FIG. 4 and will be discussed in more detail below) to create the desired VDP Families. Once Create VDP Families 150 has run, Display VDP Family Options 160 presents the prepress operator with a list of VDP Families generated from the selected variants with the number of Instance Documents belonging to each Family along with the variant's corresponding values. Satisfied with VDP Families 170 allows prepress operator input to indicate if the list of VDP Families is desirable on or not. If the prepress operator is not satisfied, then the operator can indicate this dissatisfaction by inputting via the GUI 6 and operation is returned to Select Variants 140 where another list of parameters is selected. Once the prepress operator is satisfied with the list of VDP Families then an indication is made via the GUI 6 and the creation of VDP Families is Done 180. It should be noted that it is assumed that VDP Families are selected such that the overall VDP Job is broken apart into groups of Instance Documents that can be manufactured alike providing for an overall improvement in the reliability and efficiency of fulfilling a VDP Job.

Create Sub-job 151 is an optional routine that is provided in Display VDP Family Options 160. Create Sub-job 151 can be run by the operator after Create VDP Families 150. Create Sub-job 151 is used when the operator believes that the VDP Job is to large to be a single job, or for any reason that the operator desires to create jobs that are sub-sets of the VDP Job. Create Sub-job 151 will be discussed on more detail below.

FIG. 4 is a flowchart illustrative of the VDP Analyze 250 routine used to perform the Analyze VDP Job 22 function that sorts Instance Documents to determine which VDP Family an Instance Document should be associated with. As previously stated, the VDP Families are created by a software component called Create VDP Families 150 that accepts a Variable Data Printing (VDP) job comprising many unique sub-documents (Instance Documents) and sorts them into groups of equivalent variants called VDP Families. VDP Analyze 250 begins once the VDP Job enter prepress 20 after the VDP Job has been authored in the file format that is being employed. The preferred embodiment employs a PPML/VDX file format to author the VDP Job. However, it will be understood by those skilled in the art that other file formats can also be used in place of a PPML/VDX file. Before the VDP Families routine illustrated in FIG. 4 can be run, the VDP Job File (a VDX file in the preferred embodiment) is opened. The prepress operator then selects the desired variants and the sort routine is initiated via operator input to the GUI 6.

The VDP Job description contained within the PPML/VDX file has numerous variants for the VDP Job. The variants may include: page count; media types; number of copies; pages that exceed the imaging area; and finishing. The variants are specified by the prepress operator and result in groupings that can be used as parameters. A group of Instance Documents within a VDP Job having equivalent variants can be sorted using variants as parameters to find the VDP Family. The preferred embodiment of the invention, a VDP Family will generally be determined by grouping on the order of about 5 parameters, however, the number of parameters can vary and the actual number employed can be more or less than 5 parameters or even a single parameter is possible. The operator selects the list of parameters used to sort Instance Documents into a particular VDP Family by entering the desired variants via the GUI 6. It would also be possible to have predetermined VDP Families with a predetermined list of parameters that determine the characteristics of a VDP Family. An example of a predetermined VDP Family is a sort routine run with three variants as parameters that characterize the VDP Family, such as: the number of pages per document; the finishing request; and the media. The parameter selection, preferably, implies which variants the prepress operator deems as relevant in helping manufacture the print job. Preferably, each Instance Document is sorted into exactly one VDP Family per sort operation. If another sort operation is performed applying different variants, then a particular Instance Document will be associated with a different VDP Family in accordance with that sort operation. It should be understood that while associating each Instance Document with only a single Family is the preferred mode of practicing the invention, other groupings are also possible wherein an Instance Document is associated with multiple Families simultaneously, and these differing embodiments will be readily apparent to those skilled in the art.

The Start VDP Analyze 251 routine begins with a VDP Job as defined by the PPML/VDX file and a list of variants supplied by the operator to use for creating VDP Families. Once the VDP Analyze 250 algorithm is entered, Get 1$^{st}$ Instance Document 210 begins with an empty set of VDP Families and retrieves the first Instance Document in the VDP Job. This first Instance Document is then examined to determine if an existing VDP Family has a matching set of variants by the routine Check VDP Families 220 compares the variants selected by the prepress operator with the variants that are listed within PPML/VDX file for the first Instance Document to see if there is an existing VDP Family with parameters equivalent to those listed for the current Instance Document. The variants that the prepress operator can select include: page count; media types; number of copies; pages that exceed the imageable area; finishing; page layout; page orientation; meta-data; and other possible variants. The list of possible variants is not a closed list and it is specifically envisioned by the present invention that other variants can be employed. Check VDP Families 220 verifies that the selected variants exist within this Instance Document and that there is a match for a VDP Family already created for this VDP Job. If there are variants within the Instance Document that are not found within the group of parameters specified by the prepress operator, then the routine Create a New VDP Family 225 is run to generate a new member to the list which is a match for the present Instance Document. Create a new VDP Family 225 creates a new member of the VDP Family with parameter values equivalent to the current Instance Document and then adds the current Instance Document to the new VDP Family member. If the variants specified by the prepress operator are found within the Instance Document, the Instance Document is then associated with the VDP Family that matches by Add Instance Document into VDP Family 221 which will place the current Instance Document to the VDP Family that has equivalent parameter values for all of the variants that are selected by the user.

More Instances Documents 230 will look to the list of Instance Documents to determine if there are there any more Instance Documents in the VDP Job. If there are more Instance Documents to be sorted by VDP Analyze 250, Get Next Instance Document 231 will get the next Instance Document, and return to Check VDP Families 220 to compare the variants that are listed within the PPML file for this next Instance Document to find a VDP Family that matches the variants listed. The previously discussed steps for Check VDP Families are then repeated. The list of Instance Documents will be sorted through until a false answer for More Instance Documents 230 results in a return to the calling VDP Family routine and the VDP Family Sort is completed.

Once the VDP Analyze 250 completes the VDP Families sort routine, Done 235 will provide summarized information relating to the VDP Families to the prepress operator that will allow the prepress operator how to understand and manufacture the entire VDP Job accurately and efficiently. The analysis results in sorting every Instance Document into a VDP Family and describing the characteristics of each VDP Family in order to allow the prepress operator to instruct the NexStation™/printer how to manufacture the job. The directions to the NexStation™ 4 describing how to print each VDP Family are contained in a data structure called a job ticket. The job ticket is preferably a Portable Job Ticket Format (PJTF), which is a standard file format that is created by the Adobe® job ticket and widely supported throughout the industry. Many companies have developed their own proprietary job ticket programs. While the present preferred embodiment employs PJTF, it is specifically envisioned that future embodiments will eventually migrate to another format known as Job Definition Format (JDF). After the result of the VDP Analysis is available and the VDP Families are identified, the prepress operator selects/creates a job ticket to print the job. The job ticket is written in a standard file format that is compatible with software on the NexStation™ 4. Therefore, the NexStation™ 4 comprehends the information in the Job File, and: which media to use; how to impose sheets; identifying if each sheet is 1 sided or 2 sided, or the type of finish. Once a job ticket is created, it may be attached to the PPML file and submitted to the NexStation™ 4 for fulfillment. Given the results of the analysis, the prepress operator immediately knows exactly what each Family looks like, how many Instance Documents are in each VDP Family, and can therefore create a job ticket ideally suited for each VDP Family. The job ticket associated with each VDP Family then tells the NexStation™ 4 which media types to use for each sheet, how to apply imposition of pages onto sheets, how many copies, how to finish, etc.

The prepress 20 component provides an Acrobat® standard User Interface for launching the Analyze VDP Job 22 function on a PPML/VDX file. The Acrobat® standard User interface supports the specification of virtually any combination of variants (including support for wildcards) that Analyze VDP Job 22 uses as criteria for creating VDP Families (i.e. a column of variants each with a corresponding checkbox). An example of a list of variants is page count, media types, copies, number of pages that exceed the imaging area, finishing and any variants explicitly specified through "PRIVATE_INFO" within the PPML/VDX file. Prepress 20 allows for a valid hierarchy of PPML/VDX tags and attributes to be entered as a variant (such as differentiating Families by Zip Code in PRIVATE_INFO: <PRIVATE_INFO><Zip_Code>12345</Zip_Code></PRIVATE_INFO>). The results of the "Analyze VDP Job 22"

are displayed in a clearly formatted text box on the user interface; and for each Family, displays the number of Instance Documents it contains and the parameter values of each variant.

Referring again to FIG. 3, after opening a PPML/VDX file and running Create VDP Families 150, the prepress operator has several selections to choose from presented by Display VDP Family Options 160. One of the presented options is Create Sub-job 151. Tools for selecting a set of Instance Documents are presented by the prepress workflow software component. Upon completion of selecting the set of Instance Documents for the new job, the new job is saved as a complete PPML/VDX file.

Figure 5:
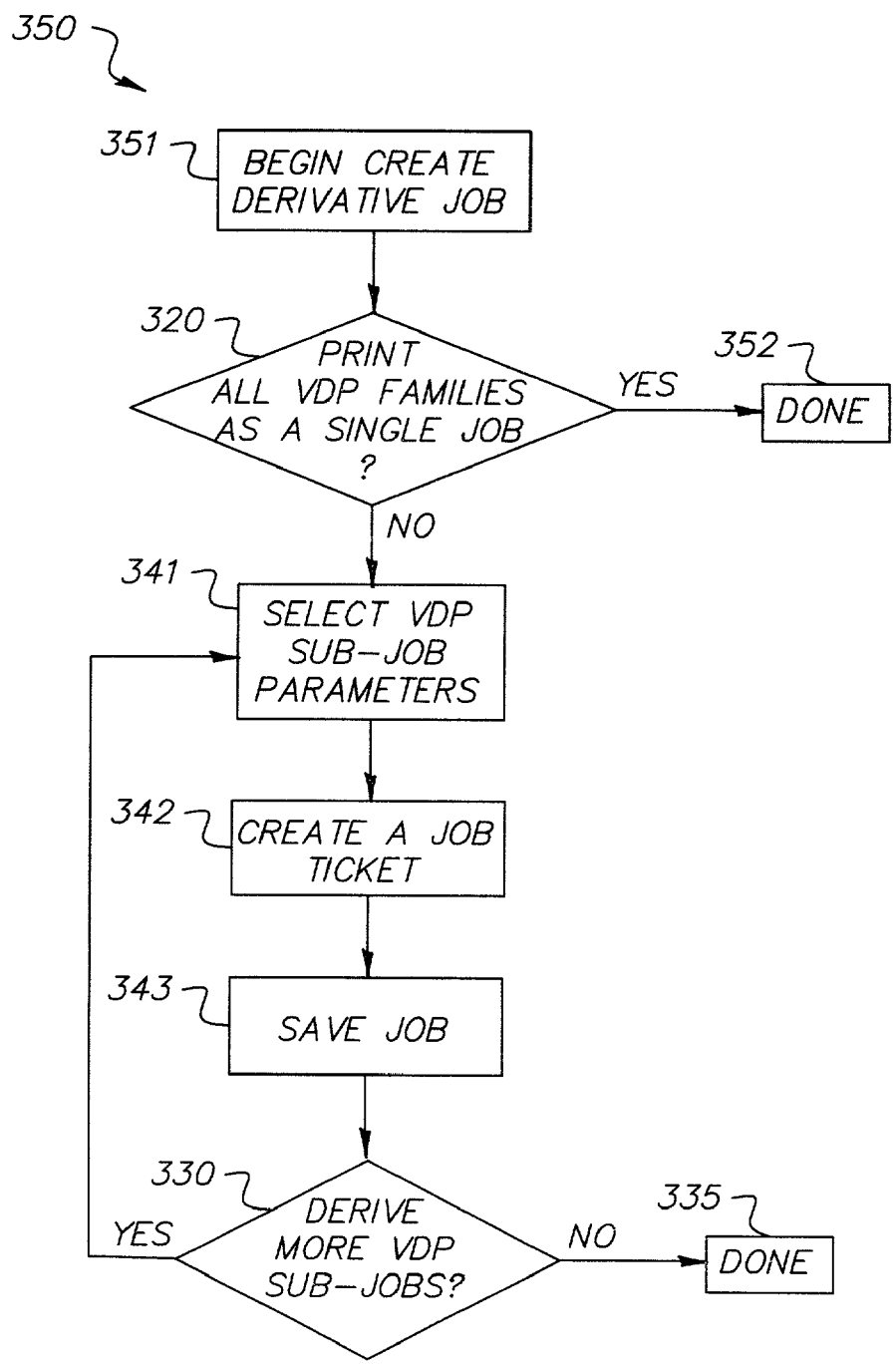
FIG. 5 is a flow diagram for an optional routine that can be run that allows the operator to create derivative jobs.

FIG. 5, is a flow diagram for the routine Create a Derivative Job 350 that is selected by Create Sub-job 151 selection while within the flowchart shown in FIG. 3. The routine for creating derivative jobs is preferably run after the flow diagram of FIG. 3 as will be discussed further below. FIG. 5 illustrates the routine for creating derivative jobs when invoked from inside the flow diagram of FIG. 3 in which case Create Derivative Job 350 can also be run before of instead of VDP Analyze 250 or in parallel with VDP Analyze 250 as shown in FIG. 5. Create Derivative Job 350 allows the operator to create multiple smaller print jobs from larger print jobs. The invention envisions the capability of creating new VDP Jobs as subsets of a larger VDP Job in those instances where the operator finds it desirable for a print job to be produced as a group of separate, smaller VDP Jobs. Smaller VDP Jobs are desirable in a number of instances, such as when proofing prints prior to a large run, or to reduce a large print job into a number of smaller ones. The invention provides a tool to extract a subset of Instance Documents from a larger VDP Job, and create a new VDP Sub-job.

Create Derivative Job 350 is invoked by operator selection of the Create Sub-job 151 option during or after the creation of VDP Families, as previously stated. In the preferred embodiment, Begin Create Derivative Job 351 summarizes the VDP Families that were determined by VDP Analyze 250 and presents the VDP Families to the operator via the GUI 6. If the operator does not select Create Sub-job 151 then the system immediately determines that Print All VDP Families as a Single Job 320 is answered in the affirmative which causes Create Derivative Job 350 to be Done 352. If the prepress operator selects Create Derivative Job 151, then Select VDP Sub-Job Parameters 341 will provide the operator with selections on the GUI 6 that include Instance Documents and VDP Families. The operator can select Instance Documents, or ranges of documents, from the parent VDP Job as parameters for the derived VDP Sub-job. The operator can also select entire VDP Families to use as parameters for the derived VDP Sub-job. Upon selection of the parameters used for creating the derived VDP Sub-job, Create a Job Ticket 342 will form a manufacturing specification for the derived VDP Job. Save Job 343 then stores the derived VDP Sub-job. The operator is then presented with a determination in Derive More VDP Sub-jobs 330, which if responded to affirmatively by the operator, returns operation to Select VDP Sub-Job Parameters 341. If the operator response to Derive More VDP Sub-jobs 330 is negative, then Done 335 returns operation to the main VDP Families routine.

One potential use for the Create Derivative Job 350 routine is to perform a Proof Job function. The prepress operator may find it desirable to run a proof job function to view print results before running a large print job. A proof job function is run by invoking Create Derivative Job 350 which allows the operator to select parameters to view and print a specific document. The prepress operator selects the proof job function by systematically selecting Instance Documents within Select VDP Parameters 341 that result in only a proof of specific documents (or set of documents) being selected. The system creates and embeds a Job Ticket that represents all of the selections and retains the selected printing device so that the entire job can be printed at a later time with all of the same parameters. The proof job is printed.

To run the routine Create Derivative Job 350, the GUI 6 will provide a selection, Create Sub-jobs 151 at one of the points previously discussed. Alternatively, Create Sub-jobs can be presented at numerous places. Once invoked, Create Derivative Job 350 has the system gather all selected Instance Documents from a list into a new PPML/VDX file, along with all referenced PDF contents. The software shall run as an Acrobat® plug-in and support all typical Acrobat® file operations (open, close, save, save as) on *.vdx files. The preferred embodiment envisions recognition of all VDX semantics within in a *.vdx file.

Figure 6:
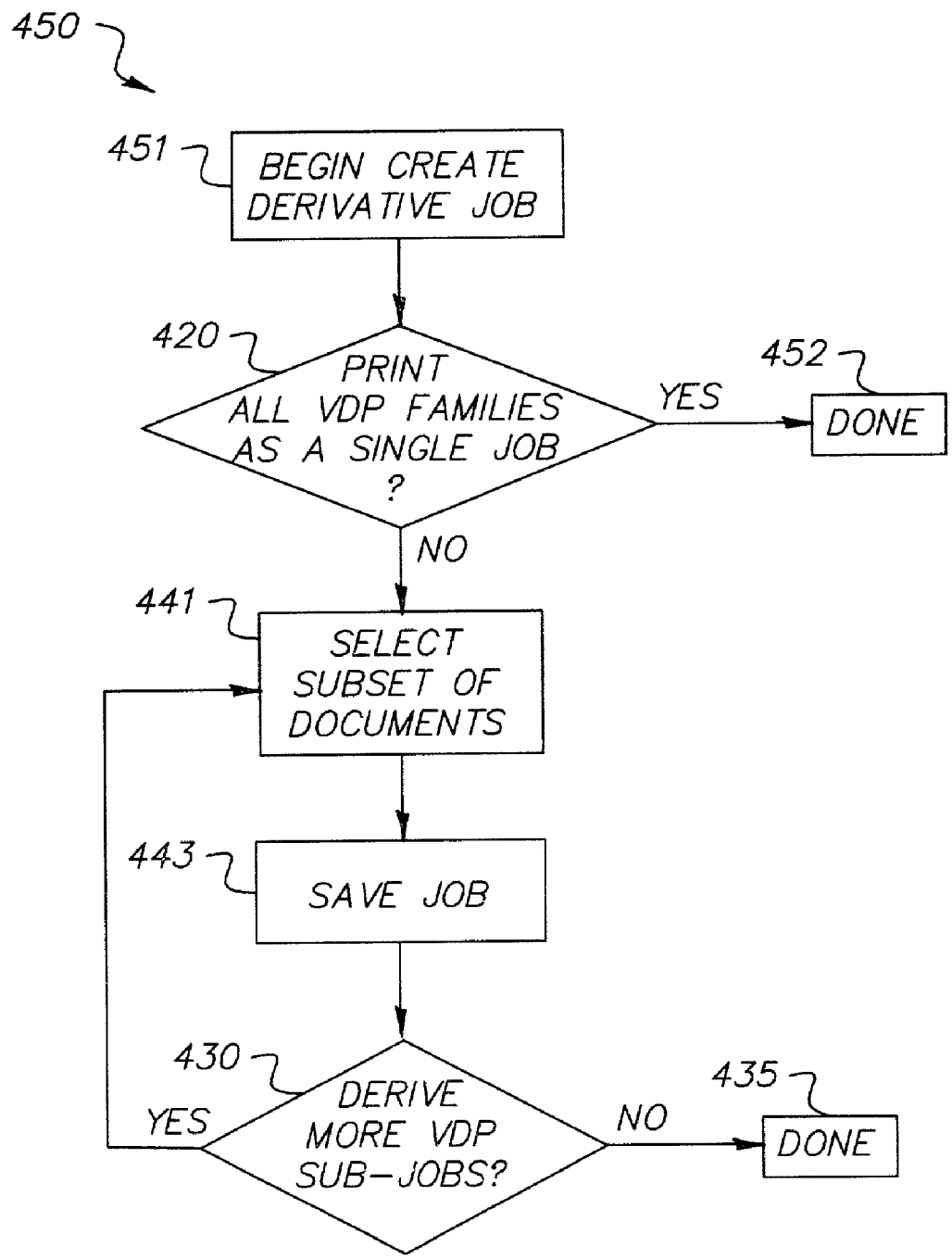
FIG. 6 is a flow diagram of the preferred embodiment of the function illustrated in FIG. 5.

FIG. 6 illustrates a flow diagram for the routine Create a Derivative Job 450 run by selecting the Create Sub-job 151 selection after the flow diagram of FIG. 3 has completed. The main difference between FIG. 6 and FIG. 5, is that FIG. 5 illustrates the routine for creating derivative jobs when invoked from inside the flow diagram of FIG. 3, while FIG. 6 illustrates the preferred embodiment of creating derivative jobs after the VDP Families have been created. The functional blocks in FIG. 6 perform essentially the same function as their equivalent blocks shown in FIG. 5. Create Derivative Job 450 allows the operator to create multiple smaller print jobs from larger print jobs.

Create Derivative Job 450 is invoked by operator selection of Create Sub-job 151 after the creation of VDP Families. Begin Create Derivative Job 451 summarizes the VDP Families that were determined by VDP Analyze 250 and presents the VDP Families to the operator via the GUI 6. If the operator does not select Create Sub-job 151 then the system immediately determines that Print All VDP Families as a Single Job 420 is answered in the affirmative which causes Create Derivative Job 450 to be Done 452. If the prepress operator selects Create Derivative Job 151, then Select VDP Sub-Job Parameters 441 will provide the operator with selections on the GUI 6 that include Instance Documents and VDP Families. The operator can select Instance Documents, or ranges of documents, from the parent VDP Job as parameters for the derived VDP Sub-job. The operator can also select entire VDP Families to use as parameters for the derived VDP Sub-job. Unlike the flow chart illustrated in FIG. 5, the selection of the parameters used for creating the derived VDP Sub-job will not result in the creation of any job tickets. The reason no job ticket is formed by the process illustrated in FIG. 6, is that the derivative job will inherently share the same job ticket as the parent VDP Family from which the sub-job is created. Save Job 443 stores the derived VDP Sub-job. The operator is then presented with a determination in Derive More VDP Sub-jobs 430, which if responded to affirmatively by the operator returns operation to Select VDP Sub-job Parameters 441. If the operator's response to Derive More VDP Sub-jobs 430 is negative, then Done 435 returns operation to the main VDP Families routine.

The invention provides the capability of creating a new VDP Job as a subset of a larger VDP Job. It is sometimes desirable to process a VDP Job as a group of separate, smaller VDP Jobs. Additionally, it may be desirable to create a new VDP Job that is a subset of a larger VDP Job. In each case, production advantages are gained in terms of the cost of collating, organizing and arranging the printed documents. The arrangement of printed documents can be based on any of numerous features. Efficiency in arranging final products is achieved through knowledge of the types of media, size of media, and eliminating much of the collating for the final printed documents.

A VDP Job may consist of from 1 to more than 10,000 Instance Documents which can vary from one to the next in terms of: page count; logical sequence of media; binding requirements; perfecting requirements; folding requirements; print product delivery requirements (the most cost effective postal sort ordering including sort by zip code and/or finished weight); print media requirements (paper weight, surface texture, brightness, brand); page size (finished size, imposed sheet size); page orientation; or page content bleed requirements.

There are many variants for documents, and even subsets of documents that can be used to categorize production ordering of variable data documents. For example, various subsets of documents or sub documents can be selected with respect to common attributes taken from many combinations of common attributes.

EXAMPLE 1

Assume that 100,000 Variable Data Print products are to be produced where the printed page quantities of the many print products vary from 4 to 16 pages. It is reasonable to assume that the weight of the various finished pieces will vary proportionally with each piece's number of pages. As such, and as part of bulk mailing optimization, it is very common for mailed pieces to be sorted into some number of bins based on specific weight ranges. Given that the quantity of pages of a finished document correlates proportionally to the finished weight of a piece, then the data itself can be used to estimate a finished piece's weight and be pre-sorted prior to actual production rather then having to be mechanically post-sorted into bins after finishing. Accordingly, using the number of pages within a document as a variant for determining sub-groups has distinct advantages.

EXAMPLE 2

Assume a job defines Variable Data Print products that have varied content as well as binding requirements. The variation in binding requires some pieces to be saddle stitched and others to be perfect bound. To keep this example relatively simple, assume all documents have exactly eight finished pages, printed two sided head-to-head, and none of the page images that are required to be perfect bound have bleeds (which would otherwise require pages to be imposed on oversized stock and be trimmed which would add to the overall manufacturing cost) and the finished documents required to be saddle stitched have a full bleed center fold (which requires trimming). Also, assume that the printing device to be used can print letter size (8.5×11) or two up letter (12×18). To best produce the job, the characteristics are during an analysis by the operator. The operator then decides to print all finished pieces required to be perfect bound in a first run, and the pieces to be saddle stitched in a second run. Assume that the operator based the decision to make these two runs due to the perfect bound run being very simple to produce because pages have no bleeds and can simply be printed two sided in reader order with separator sheets. Moreover, absolutely no imposition is required and, hence, no trimming is required. The second run, however, is saddle stitched. This means that imposition of four pages on a sheet is required. Also, since the centerfold has a full bleed, all pages must be printed on oversized 12×18 sheets and be trimmed down to a finished 11×17 size prior to binding. From this example, numerous variants are involved to create the two runs. By allowing the operator to apply the variants in a manner that can efficiently produce the final documents, a significant savings in time and effort is achieved by the invention.

The preferred embodiment provides selection criteria for Instance Documents to be placed into a list for further processing. In the context of a proof job, Instance Documents are selected from the VDP for "further processing". This means submitting the proof job to the press to view the results. Frequently, an operator will then make modifications to color management, media, or layout as a result of the proof before committing the entire job to the press. Take first Instance Document from each VDP family; take every nth Instance Document from each VDP family (n is 1 to 1000); add and/or delete all selected Instance Documents from a VDP family; and add and/or delete specific Instance Documents.

A proof job is just a specific type of derivative job and the invention envisions creating derivative jobs essentially as one of two types of derivative jobs, manual and automatic.

In a manual derivative job, typically an operator will be able to create a VDP Sub-job based on: manufacturing differences; size of job preferences; or the need to select a few specific documents. Each of the manual examples of manual creation of VDP Sub-jobs can be performed by the operator making the appropriate selection within Select VDP Sub-job parameters 341, 441 using GUI 6.

Those skilled in art will realize that the process of Creating VDP Sub-jobs can be automated. An automatic derivative job would be especially desirable in the event that the variants used to create a VDP Sub-job are based on production intent parameters that usually (but not necessarily) would be done for Proof Job purposes. Additionally, an automatic derivative job may be based on PDF content differences which also usually (but not necessarily) are done for purposes of making a Proof Job. Another automatic, PDF based derivative job could be to check for device color space differences.

In summary, the following Flow of Events creates new sub jobs from the original PPML/VDX jobs. The prepress operator selects VDP Analyze". The prepress operator selects "Create Derivative Job" The prepress workflow software component provides a UI to systematically select a set of Instance Documents to include in the new Job. The prepress operator selects "Save New Job" to the file system.

REQUIREMENTS

To run the routine "Create Derivative Job" selection within the preferred embodiment, as provided by the GUI 6, the system shall have the "Save New Job" function gather all selected Instance Documents from a list into a new PPML/VDX file, along with all referenced PDF contents. The software shall run as an Acrobat® plug-in and support all typical Acrobat® file operations (open, close, save, save as) on *.vdx files. The preferred embodiment envisions recognition of all VDX semantics within in a *.vdx file.

The system software envisions the capability to associate a DTD. A DTD is a file that verifies that an XML (PPML) file is formatted legally and in compliance with an intent. The intent here is that the file is a PPML/VDX file. An alternative to a DTD is a something called a schema. We may utilize either of these two methods for validating the structure of a PPML/VDX file. The system software also provides the option to test the XML portion of the PPML/VDX file for being "valid" or "well-formed". Within the preferred embodiment, the system software disallows editing a PPML/VDX file from within the Acrobat® environment, however, it should be understood that those skilled in the art will foresee the capability for editing within an Acrobat® environment and these variations are specifically envisioned by the present invention.

Referring to FIG. 2, within the preferred embodiment, Define Manufacturing Intent 25 is a function that is performed by the prepress 20 in order to define the production parameters that are responsible for manufacturing the job as intended. Define Manufacturing Intent 25 is a function that sets the production parameters accurately and efficiently, to print and finish the print job as specified in a PPML/VDX file. The prepress operator should be aware of the capabilities of the device in order to determine the optimal way to print and finish a PPML/VDX job. Therefore, one of the functions of Define Manufacturing Intent 25 is to query the printing device (the NexStation™ 4 in the case of the preferred embodiment) for its "Manufacturing Capabilities". Included in "Manufacturing Capabilities" for the device are the "Media Catalog", the "Static Imposition Template Catalog", and the "Finishing Capabilities". Communication between the prepress 20 component and the PPML/VDX Job Production 30 component provides a list of the available media types is obtained from the media catalog 39. The prepress operator maps each logically specified media in the VDP Family to a physical media type supported in the Media Catalog 39 of the device's Manufacturing Capabilities. An imposition scheme is selected that will accurately and efficiently print each Instance Document of the VDP Family. An imposition scheme for a VDP Family can be specified in several different ways:

- Selecting an imposition template from the device's (NexStation™ 4 in the case of the preferred embodiment) "Static Imposition Template Catalog"
- Don't specify any imposition scheme and thus allow the device to perform imposition using it's default imposition scheme
- Associate a job ticket from the file system which contains an "Static Imposition Template"
- Select parameters for specifying a simple (typically 1-up) "Static Imposition Template"

The selection of a static imposition template for a VDP Family involves consideration of the mapping of the logically specified media and finishing specifications in the PPML/VDX to the physical capabilities of the device. PPML/VDX pages may have a logical media name (such as "Heavy Letter", "Insert1", or "Dave's Favorite Paper Type") which the prepress operator assigns to a specific paper defined in the device's Media Catalog (such as "Hammermill #06200-8") based on communication between himself and the PPML/VDX job producer. Additionally, the prepress operator determines what page layout will yield the best results. The VDP Family may have a logically specified finishing requirement (such as "Saddle-Stitch" or "Bind") which needs to be mapped to a physical finishing capability of the device and defined in an Adobe® Job Ticket. Lastly, the number of copies to be produced of each Instance Document in the VDP Family needs to be considered. There are some cases (i.e. business cards, postcards) in which multiple copies of the same Instance Document should be imposed in a particular orientation. The assigning of a static imposition template and Job Ticket will direct the device to accurately and efficiently produce the VDP Family.

The system software of the present invention is able to define the production parameters of a PPML/VDX job by treating the entire file as a single Family. This intermediate level of functionality is viewed in conjunction with the capability of having the ability to split a multiple VDP Family job into single VDP Family Sub-jobs. The functionality of treating the PPML/VDX job as a single file allows for a single file production of a PPML/VDX job with multiple VDP Families.

Once the PPML/VDX file has been opened by the prepress component 20, the prepress operator will obtain the results of Analyze VDP Job 22. In order to Define Production Parameters, the prepress operator selects a device (NexStation™ 4 in the preferred embodiment) and queries the device (NexStation™ 4) for its manufacturing capabilities. Once the manufacturing capabilities are received, the prepress operator selects a VDP Family from the list created by Analyze VDP Job to define the production parameters needed for manufacturing that subset of the PPML/VDX Job.

A communications interface between the prepress 20 and production 30 areas allows the prepress operator to map the logically specified media and finishing contained within the VDP Family to a physical media and finishing option supported in the device's Manufacturing Capabilities.

After reviewing all production parameter selections, the prepress operator may accept the selections for that VDP Family. The result of the production parameter selections is then put into a job ticket which will describe the manufacturing intent of the production parameters, and reference which Instance Documents within the PPML/VDX Job that this set of productions parameters are to be applied. Note that within the preferred embodiment, the job ticket format will be PJTF or JDF, however, is should be understood that other formats can be employed as will be readily apparent to those skilled in the art.

The foregoing steps are then repeated for each VDP Family from the Analyze VDP function. The prepress operator then confirms that all VDP Families are properly specified for production. Any final job ticket processing is completed. The PPML/VDX Job is then ready for submission.

The Define Manufacturing Intent uses system software to present results of Analyze VDP Job 22 on the GUI 6 which then allows the prepress operator to specify all required production parameters for each VDP Family. The list of required parameters to be specified for each VDP Family from the Manufacturing Capabilities provided by the selected NexStation™ 4 are as follows: the number of copies of each Instance Document in the VDP Family to be produced; a default physical media type for all PPML/VDX pages not explicitly specified with a logical media type; a physical media type for each logical media type specified; a static imposition template; and finishing capability.

The system software requests the prepress operator to confirm when finished making production selections on any or all VDP Families. It is, therefore, not required that all VDP Families be selected for production. The system software adds the confirmed production selections for all VDP Families into Adobe® Job Ticket(s), which in the preferred embodiment is based on PJTF, however, it will be readily apparent to those skilled in the art that other data structures can also be employed, such as JDF for example. The system software supports rule based job ticket merging after a Job Ticket has already been embedded into a PPML/VDX Job by a prior process. The system software embeds the associated Adobe® Job Ticket(s) into the PPML/VDX file as specified by Adobe® for PDF files.

Job Submission 27 is a function that provides the operator of the prepress 20 to open the PPML/VDX file and perform desired actions prior to submitting the PPML/VDX file to production 30. Job submission 27 submits a job in a PPML/VDX format to a printing device for fulfillment after all operations on the VDP Job are completed by the prepress 20 operator. In the preferred embodiment, Job Submission 27 is done as a single file exchange. The preferred embodiment implements a single file which contains all of the PPML, referenced PDF objects and any associated job ticket. However, it is specifically envisioned that in other implementations that allow for a multi-file submission, the PPML may refer to PDF object in an external file.

Job Submission 27 begins with the operator for prepress 20 selecting the device to print on, which in the preferred embodiment is the NexStation™ 4, however other devices also are envisioned as being supported. For example, if all pages in a job are to be printed in black and white, then a black and white printer would be the preferred device. In the prepress 20 area, the prepress operator logs into the device, depending upon the configuration of the device, and selects "Print Properties" to access device dependent capabilities. The desired print parameters that the device presents to the client are selected and confirmed (like a PPD). These selected parameters are then added to the Adobe® Job Ticket that is embedded into the PPML/VDX file. If the PPML/VDX file already had a Job Ticket, then the new parameters are merged into the existing data structure. If there was no Job Ticket previously, then one is created and added. The prepress operator selects "Print" and the selected device receives the PPML/VDX file, performs Job Ticket merging, and proceeds to RIP and process the job. Alternatively, the file can be exchanged for printing at a later time by selecting the device to print to. Having the knowledge and experience of the job and the print device, the operator simply moves the PPML/VDX file into a pre-defined and debugged Virtual Printer that has been created on the device (such as the NexStation™ 4). The PPML/VDX file may or may not have an embedded Job Ticket at the time of transfer to NexStation™ 4.

Within the preferred embodiment, the system supports and integrates a NexStation™ 4 print driver as well as a GUI 6 to launch and support a NexStation™ 4 print driver. The GUI 6 allows selection and submission by submitting the PPML/VDX job to the selected device (NexStation™ 4 or other printing device). It is envisioned by the invention to employ network browsing, provided by the system, to locate existing virtual printers or other printing devices for the NexStation™ 4. The invention also envisions future re-printing provided by having the printing device selected by the Job Ticket so that the job can be identically reproduced. Upon selection of a "Print" command, the system software moves the selected PPML/VDX file to the input queue of the selected NexStation™ 4 or other printing device The foregoing description details the best mode known to the inventors for practicing the invention. Variations of the best mode will be readily apparent to those persons skilled in the relevant arts, therefore, the scope of the invention should be measured by the appended claims.

What is claimed is:

1. A print job preparation method comprising the steps of:
    providing a variable data print job having layout data, content data, and product intent data of a plurality of instance documents, said layout data and content data defining appearance of variable page content in the respective said instance documents, said product intent data being additional to said layout and content data, said product intent data defining a plurality of variants of device independent physical characteristics of said instance documents;
    forming a plurality of families of said instance documents based on user selection of a group of one or more of said variants;
    obtaining a description of manufacturing capabilities from a selected printing device;
    allowing the user to select individual said families and then specify manufacturing instructions to the selected printing device for printing the respective said instance documents of the selected said families;
    encoding at least one job ticket to include said manufacturing instructions to the selected printing device for printing the respective said instance documents;
    allowing the user to select a subset of said instance documents from a group of selections on a user interface, said selections including said plurality of instance documents and said plurality of families, to provide a variable data print sub-job; and
    printing said variable data print sub-job separately from said variable data print job using said subset of said instance documents.

2. The method of claim 1 further comprising:
    extracting said selected subset in parallel with said forming; and
    wherein said printing further comprises encoding at least one additional job ticket having manufacturing instructions to said printing device relating to said variable data print sub-job.

3. The method of claim 1 wherein said variants include: page count, media type, number of copies, occurrence of pages imaging area exceeded, page layout, page orientation, and finishing.

4. The method of claim 1 wherein said user selection is of a plurality of said variants and said variants include: page count; media type; number of copies; occurrence of pages imaging area exceeded; meta-data, page layout; page orientation and finishing.

5. The method of claim 1 wherein said subset is one of:
    (a) one or more of said families; and
    (b) one or more instance documents wherein said subset is partially inclusive of the respective one or more families.

6. The method of claim 1 further comprising:
    extracting said selected subset after said forming and encoding; and
    using, during said printing, said at least one job ticket of respective said families that include the instance documents of said subset.

7. The method of claim 1 wherein said allowing further comprises:
    accepting selection of one or more parameters of said variants; and
    extracting, as said selected subset, one or more of said instance documents having said selected one or more parameters.

8. The method of claim 7 wherein said sub-job is a proof and said method further comprises encoding at least one separate job ticket having manufacturing instructions to said printing device relating to said variable data print sub-job.

9. The method of claim 7 wherein one of said parameters is from said content data.

10. The method of claim 9 wherein said parameter from content data is one of: color, size, and density.

11. A print job preparation system comprising:

a computational device operatively connected to receive and interpret a variable data print job having layout data, content data, and product intent data of a plurality of instance documents, said layout data and content data defining appearance of variable page content in the respective said instance documents, said product intent data being additional to said layout and content data, said product intent data defining a plurality of variants of device independent physical characteristics of said instance documents; and a user interface operatively connected to said computational element;

wherein said user interface displays said variants and accepts user selection of a group of one or more of said variants, said computational device forms a plurality of families of said instance documents based on said set of variants, obtains a description of manufacturing capabilities from a selected printing device; allows the user, via said user interface, to select individual said families and then specify manufacturing instructions to the selected printing device for printing the respective said instance documents of the selected said families, encodes at least one job ticket to include said manufacturing instructions to the selected printing device for printing the respective said instance documents, and said computational device extracts a subset of said instance documents to provide a variable data print sub-job, said subset being selected by the user via said user interface from a presented group of selections including said plurality of instance documents and said plurality of families.

12. The system of claim 11 wherein said subset is extracted in parallel with said forming, and said computational device encodes at least one separate job ticket having manufacturing instructions to said printing device relating to said variable data print sub-job.

13. The system of claim 11 wherein said subset is extracted after said forming and encoding, and said computational device provides to use in producing the subset, said at least one job ticket of respective said families that include the instance documents of said subset.

14. The system of claim 11 wherein said variants include: page count, media type, number of copies, occurrence of pages imaging area exceeded, page layout, page orientation, and finishing.

15. The system of claim 11 wherein said user selection is of a plurality of said variants and said variants include: page count; media type; number of copies; occurrence of pages imaging area exceeded; meta-data, page layout; page orientation and finishing.

16. The system of claim 11 wherein said subset is one of:
(a) one or more of said families; and
(b) one or more instance documents wherein said subset is partially inclusive of the respective one or more families.

\* \* \* \* \*

UNITED STATES PATENT AND TRADEMARK OFFICE
CERTIFICATE OF CORRECTION

PATENT NO.        : 7,375,842 B2
APPLICATION NO.   : 10/118770
DATED             : May 20, 2008
INVENTOR(S)       : David Kloosterman et al.

It is certified that error appears in the above-identified patent and that said Letters Patent is hereby corrected as shown below:

Issued Patent

| Column | Line | Description of Error |
|---|---|---|
| First Page Col. 1 (U.S. Patent Documents) | 8 | Delete "5,795,930" and insert -- 5,796,930 --, therefor. |

Signed and Sealed this

Twenty-second Day of September, 2009

David J. Kappos
*Director of the United States Patent and Trademark Office*